United States Patent
Yankovich et al.

(10) Patent No.: US 8,213,916 B1
(45) Date of Patent: Jul. 3, 2012

(54) VIDEO PROCESSING SYSTEM FOR IDENTIFYING ITEMS IN VIDEO FRAMES

(75) Inventors: Steve Yankovich, San Jose, CA (US); Ryan Melcher, Ben Lomond, CA (US); Robert Dean Veres, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/341,552

(22) Filed: Dec. 30, 2011

Related U.S. Application Data

(63) Continuation of application No. 13/050,721, filed on Mar. 17, 2011.

(51) Int. Cl.
*H04L 29/06* (2006.01)

(52) U.S. Cl. ............... 455/414.3; 455/564; 715/808; 715/855; 345/173; 386/95

(58) Field of Classification Search ............. 455/564, 455/414.3; 348/333.01; 715/808, 855; 345/173; 386/95; 725/136
See application file for complete search history.

(56) References Cited

U.S. PATENT DOCUMENTS

| | | | |
|---|---|---|---|
| 2008/0046956 A1* | 2/2008 | Kulas | 725/136 |
| 2008/0136785 A1* | 6/2008 | Baudisch et al. | 345/173 |
| 2008/0176602 A1* | 7/2008 | Kim | 455/564 |
| 2009/0003797 A1* | 1/2009 | Nash | 386/95 |
| 2009/0049413 A1* | 2/2009 | Lehtovirta et al. | 715/855 |
| 2010/0020221 A1* | 1/2010 | Tupman et al. | 348/333.01 |
| 2011/0219333 A1* | 9/2011 | Park | 715/808 |

* cited by examiner

*Primary Examiner* — David Q Nguyen
(74) *Attorney, Agent, or Firm* — Schwegman, Lundberg & Woessner, P.A.

(57) ABSTRACT

A picture captured via an optical input of a mobile device is received. A selection of an area of the picture via the touch screen input on the mobile device is received. An item in the selected area of the picture is identified. The picture is tagged with an identification of the item. An offer related to the identified item is generated.

18 Claims, 18 Drawing Sheets

| | |
|---|---|
| MERCHANT NAME<br>802 | JOE'S ELECTRONICS |
| ITEM NAME<br>804 | XYZ S100 DIGITAL CAMERA |
| BRAND NAME<br>806 | XYZ |
| MODEL NAME<br>808 | S100 |
| CATEGORY TAG<br>810 | PERSONAL ELECTRONICS |
| SUB-CATEGORY TAG<br>812 | DIGITAL CAMERA |
| INCENTIVE<br>814 | 40% OFF MSRP |
| INCENTIVE TERMS<br>816 | LIMIT ONE, VALID TODAY ONLY |

FIG. 8

VIDEO PROCESSING SYSTEM FOR IDENTIFYING ITEMS IN VIDEO FRAMES

RELATED APPLICATIONS

This application is a Continuation of U.S. application Ser. No. 13/050,721, filed on Mar. 17, 2011, which is incorporated herein by reference in its entirety.

TECHNICAL FIELD

Example embodiments of the present application generally relate to image recognition, and more specifically, to a method and system for identifying items in video frames.

BACKGROUND

Mobile devices such as smart phones have increasingly become prevalent. Most smart phones include an optical lens for taking pictures. A user interested in an item, for example, at a friend's place or while walking on the street, may use the photo feature on the smart phone to take a picture of the item. Unfortunately, the user of the smart phone has to hold the mobile device steady and the object being pictured needs to remain static otherwise the picture will come out blurry. As such, the user may opt to record a video of a dynamic scene instead of taking pictures.

BRIEF DESCRIPTION OF THE DRAWINGS

The present invention is illustrated by way of example, and not by way of limitation, in the figures of the accompanying drawings in which:

FIG. 8 is a table illustrating an example embodiment of a data structure;

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a method and a system generate offers to a user of a mobile device based on items identified in a video frame from a mobile device. A video frame selector module determines a video frame to process from the mobile device. An item identification module identifies an item in the determined video frame using an image recognition algorithm and tags the determined video frame with an identification of the item. Tags identifying the item can also be placed in the video frame adjacent to the identified item. In one embodiment, the offers just include offers to buy the product through one or more merchants. In another embodiment, the offers include an incentive to a user of a mobile device based on a geographic location of the mobile device. Incentives include and are not limited to promotions, discounts, sales, rebates, coupons, and so forth. In another embodiment, the incentive may also include item recommendations.

Figure 1:
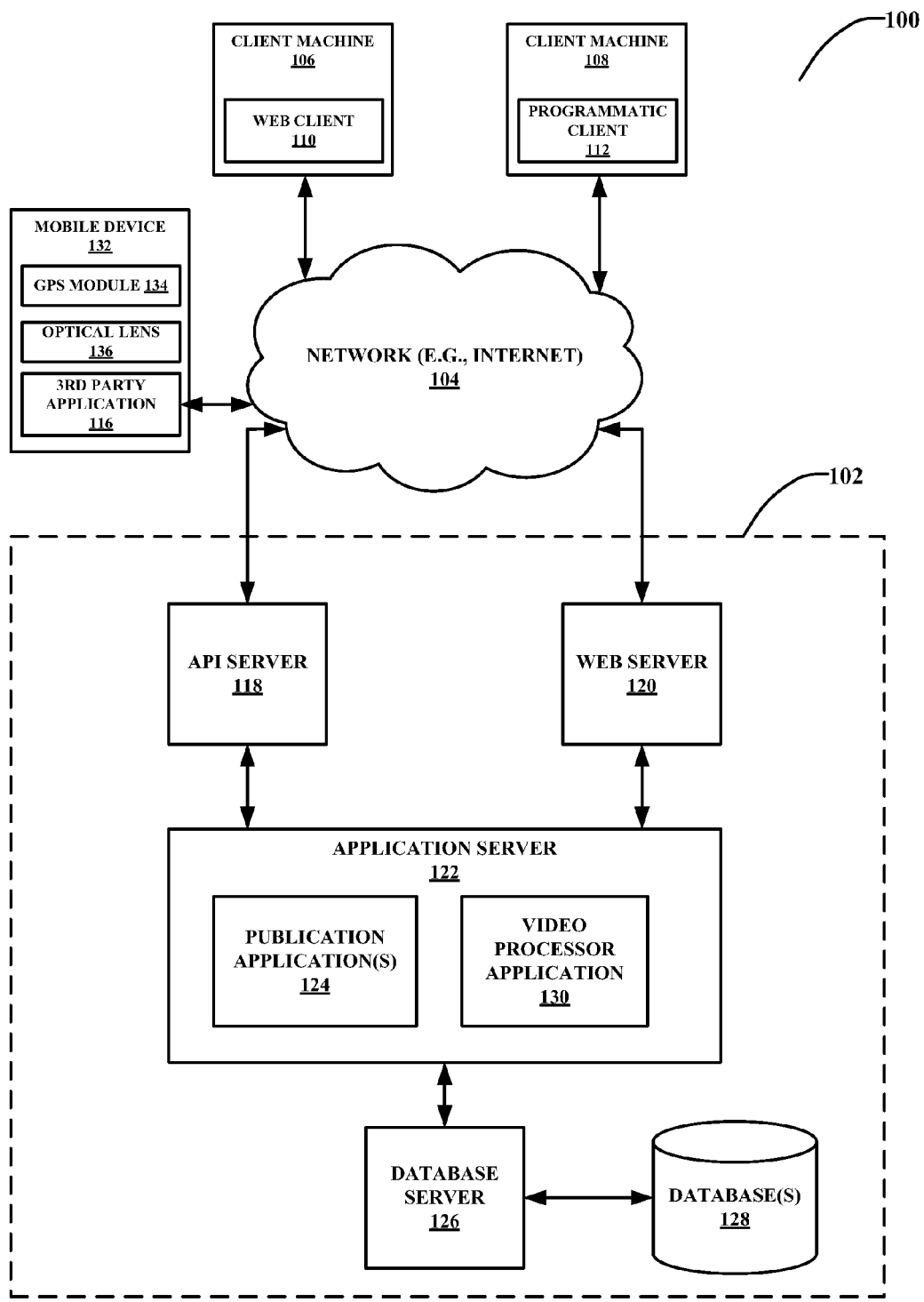
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a publication/publisher system 102 where clients may communicate and exchange data within the network system 100. The data may pertain to various functions (e.g., online item purchases) and aspects (e.g., managing content and user reputation values) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 114. These transactions may include transmitting, receiving (communicating) and processing data to, from, and regarding content and users of the network system 100. The data may include, but are not limited to, content and user data such as feedback data; user reputation values; user profiles; user attributes; product and service reviews; product, service, manufacture, and vendor recommendations and identifiers;

product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application, or a third party server 114 hosting a third party application 116. It can be appreciated in various embodiments the client machine 106, 108, or third party application 114 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

A mobile device 132 may also be in communication with the network-based publisher 102 via a web server 120. The mobile device 132 may include a portable electronic device providing at least some of the functionalities of the client machines 106 and 108. The mobile device 132 may include a third party application 116 (or a web client) configured communicate with application server 122. In one embodiment, the mobile device 132 includes a GPS module 134 and an optical lens 136. The GPS module 134 is configured to determine a location of the mobile device 132. The optical lens 136 enables the mobile device 132 to take pictures and videos.

Turning specifically to the network-based publisher 102, an application program interface (API) server 118 and a web server 120 are coupled to, and provide programmatic and web interfaces respectively to, one or more application servers 122. The application servers 122 host one or more publication application(s) 124. The application servers 122 are, in turn, shown to be coupled to one or more database server(s) 126 that facilitate access to one or more database(s) 128.

In one embodiment, the web server 120 and the API server 118 communicate and receive data pertaining to listings, transactions, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., client application 112 or third party application 116) running on another client machine (e.g., client machine 108 or third party server 114).

A publication application(s) 124 may provide a number of publisher functions and services (e.g., listing, payment, etc.) to users that access the network-based publisher 102. For example, the publication application(s) 124 may provide a number of services and functions to users for listing goods and/or services for sale, facilitating transactions, and reviewing and providing feedback about transactions and associated users. Additionally, the publication application(s) 124 may track and store data and metadata relating to listings, transactions, and user interaction with the network-based publisher 102.

FIG. 1 also illustrates a third party application 116 that may execute on a third party server 114 and may have programmatic access to the network-based publisher 102 via the programmatic interface provided by the API server 118. For example, the third party application 116 may use information retrieved from the network-based publisher 102 to support one or more features or functions on a website hosted by the third party. The third party website may, for example, provide one or more listing, feedback, publisher or payment functions that are supported by the relevant applications of the network-based publisher 102.

The network-based publisher 102 may provide a multitude of feedback, reputation, aggregation, and listing and price-setting mechanisms whereby a user may be a seller or buyer who lists or buys goods and/or services (e.g., for sale) published on the network-based publisher 102.

The publication application(s) 124 are shown to include, among other things, one or more application(s) which support the network-based publisher 102, and more specifically, the listing of goods and/or services for sale, the receipt of feedback in response to a transaction involving a listing, and the generation of reputation values for users based on transaction data between users.

The application server 122 may include a video-processor application 130 that communicates with publication application 124. The video processor application processes video frames sent from the mobile device 132 to identify items contained in a video frame and to provide item listings and generate offers or incentives to the mobile device as further described below. As items are identified in processed video frames, the video frame is tagged to allow for a "shopping pause" where a user of the mobile device 132 can pause video content and learn more about or purchase the identified item being shown in the video frame.

Figure 2:
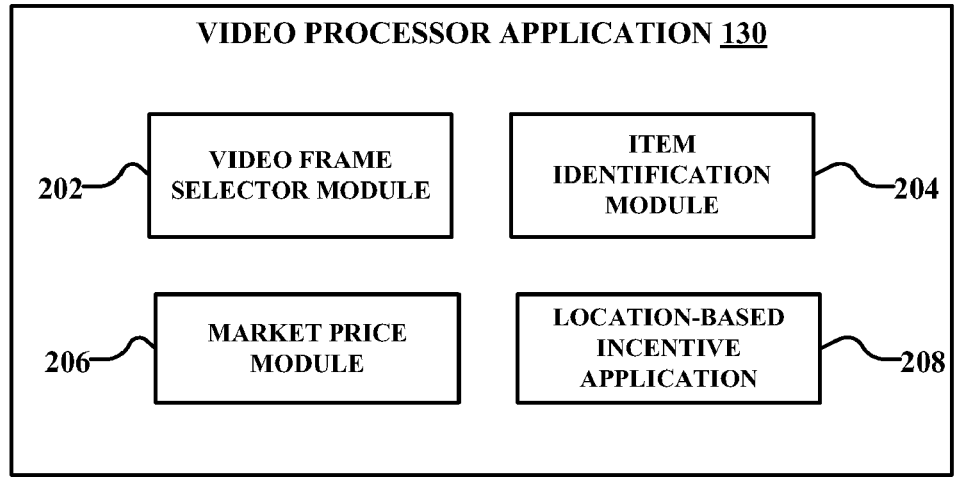
FIG. 2 is a block diagram illustrating an example embodiment of a video processor application.

FIG. 2 is a block diagram illustrating an example embodiment of the video processor application 130. The video processor application 130 can include a video frame selector module 202, an item identification module 204, a market price module 206, and a location-based incentive application 208. Each module (or component or sub-module thereof) may be implemented in hardware, software, firmware, or any combination thereof. In an example embodiment, each of the foregoing modules may be implemented by at least one processor.

The video frame selector module 202 determines which video frame (from a video clip) to process from the mobile device 132. An embodiment and operation of the video frame selector module 202 is explained in more detail with respect to FIG. 3.

The item identification module 204 identifies an item in the selected video frame and tags the determined video frame with an identification of the item. An embodiment and operation of the item identifier module 204 is explained in more detail with respect to FIG. 4.

The market price module 206 generates offers of the identified item from at least one merchant to the mobile device. For example, the market price module 206 determines a current market price of the identified item using online databases, online price comparison websites, and/or online retailer prices. In one embodiment, the market price module 206 can provide the latest bidding prices from an online auction website for the identified item. In another embodiment, the market price module 206 can provide the price of the identified item sold at retail stores (nearby or online).

The location-based incentive application 208 offers incentives from at least one local merchant based on the identified item and a geographic location of the mobile device 132. An embodiment and operation of the location-based incentive application 208 is explained in more detail with respect to FIG. 5.

Figure 3:
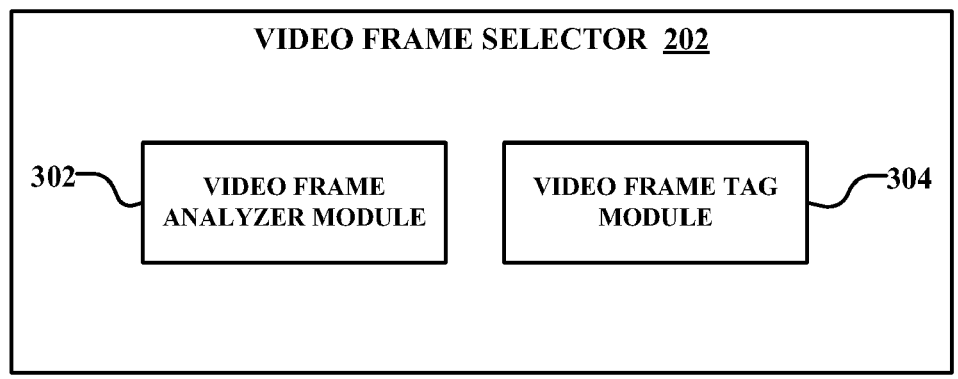
FIG. 3 is a block diagram illustrating an example embodiment of a video frame selector module.

FIG. 3 is a block diagram illustrating an example embodiment of a video frame selector module 202. The video frame selector module 202 comprises a video frame analyzer module 302 and a video frame tag module 304.

To efficiently process video frames, the video processor application 130 only processes video frames that exceeds a predetermined amount of motion, thereby indicating a change or movement in the video frame subject matter. As such, the video frame analyzer module 302 determines a difference in a scene between a first video frame and a second video frame in a video clip from the mobile device 132. For example, the video may include a subject walking down a street. As such, the person will be moving relative to the street in the video clip. The video frame analyzer module 302 thus analyzes a difference of how much the subject matter has moved between a first video frame and a second frame.

The video frame tag module 304 tags the first or second video frame for item identification when the difference exceeds a predetermined amount of motion. As such, not every video frame is processed for item identification to preserve resources. Video frames that are to be processed for item identification are tagged for identification purposes. For example, a video frame that has been selected to be processed is tagged with a "shopping pause" tag. The tagged video frame is also referred to as the determined or selected video frame. In another embodiment, the video frame tag module first determines whether a video frame contains an item to be identified before tagging the video frame for a shopping pause.

Figure 4:
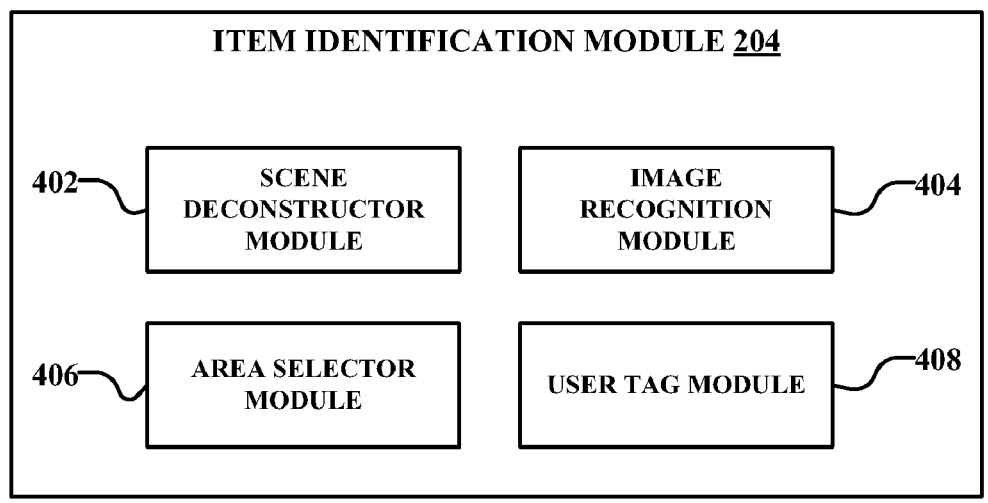
FIG. 4 is a block diagram illustrating an example embodiment of an item identification module.

FIG. 4 is a block diagram illustrating an example embodiment of the item identification module 204. The item identification module 204 includes a scene deconstructor module 402, an image-recognition module 404, an area selector module 406, and a user tag module 408.

The scene deconstructor module 402 deconstructs a scene in the determined video frame into several areas. For example, the scene deconstructor module 402 analyzes each area of the video frame for item identification. For example, the video frame may contain an image of a person with a hat, a handbag, and shoes. The scene deconstructor module 402 separately analyzes the hat in one area, the handbag in another area, and shoes in another area.

The image-recognition module 404 identifies the item based on a comparison of an image of the item from the determined video frame with a library of item images using an image recognition algorithm. The image-recognition module 404 further labels the image of the identified item in the determined video frame. In another embodiment, the image recognition module 404 identifies the item in the corresponding area of the determined video frame. In another embodiment, the image recognition module 404 identifies the item in the selected area in the determined video frame. In one embodiment, image-recognition module 404 determines a name of the identified item and a price of the identified item, and labels the name and price of the identified item adjacent to the image of the identified item in the determined video frame.

The area selector module 406 receives a user selection of an area in the determined video frame to identify the item. For example, a user may select an area in the video frame on which to focus on. Using the previous example, the user may tap on the image of the hat in the video frame to identify the item which is of interest to the user. In another example, the user may tap and drag a rectangular area in the video frame for the image recognition module 404 to focus on and analyze items in the selected rectangular area.

The user tag module 408 receives a user input tag to help identify the item in the determined video frame. For example, the user may tap on the image of a hat in the video frame and then enter the word "hat" for the image recognition module 404 to focus its search on hats. The word "hat" may be tagged to the identified item.

Figure 5:
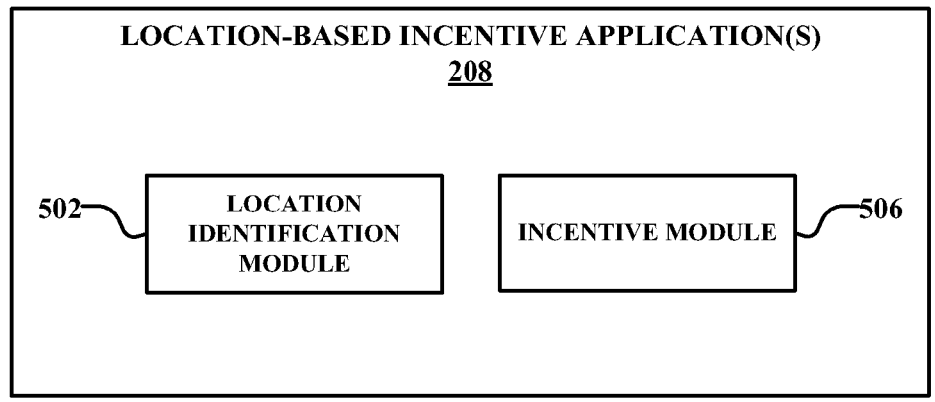
FIG. 5 is a block diagram illustrating an example embodiment of a location-based incentive module.

FIG. 5 is a block diagram illustrating an example embodiment of a location-based incentive module. The location-based incentive application 208 has a location identification module 502 and an incentive module 506.

The location identification module 502 determines a geographic location of the mobile device 132. The incentive module 506 communicates an incentive from one or more local merchants based on the identified item and the geographic location of the mobile device 132. The incentive can include a coupon, a discount, or a recommendation.

In one embodiment, the location-based incentive application 502 receives a communication from the mobile device 132. For example, the communication may include a location of the mobile device 132. Based on the location of the mobile device 132 and the identified item from item identifier module 204, the incentive module 506 consults with the database server 126 and database 128 to determine and communicate incentives from local merchants to the mobile device 132.

In another embodiment, the incentive module 506 identifies local merchants in the area of the mobile device that have the identified item in stock for sale.

Figure 6:
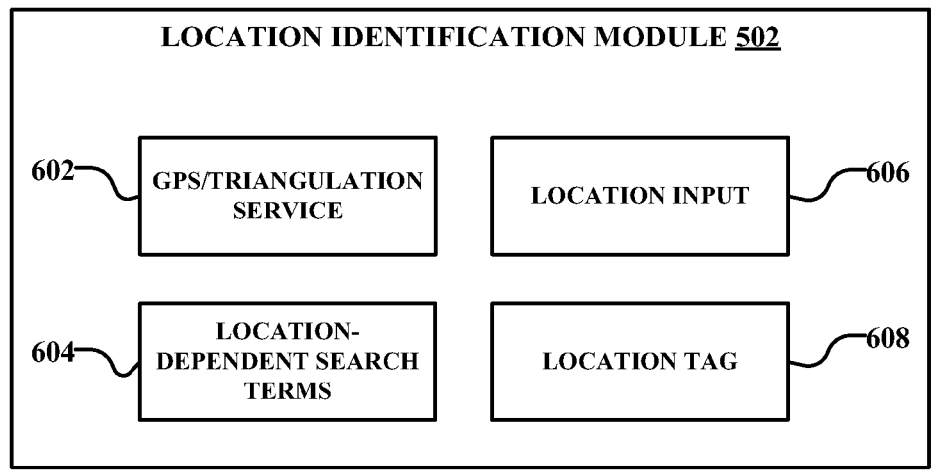
FIG. 6 is a block diagram illustrating an example embodiment of a location identification module.

FIG. 6 is a block diagram illustrating an example embodiment of the location identification module 502. The location of the mobile device 132 can be determined in many ways. For example, the mobile device 132 may be equipped with a Global Positioning Service (GPS) system that would allow the device to communicate the coordinate or location of the mobile device to a GPS/triangulation module 602 of the location identification module 502. In another example, the location of the mobile device 132 may be determined by triangulation using wireless communication towers and/or wireless nodes (e.g. wi-fi hotspots) within wireless signal reach of the mobile device 132. Based on the geographic coordinates, the GPS/triangulation module 602 of the location identification module 502 can determine the geographic location of the mobile device 132 after consulting a mapping database (not shown). Furthermore, the general location of the mobile device 132 can be located when the user of the mobile device 132 logs onto a local internet connection for example, at a hotel or coffee shop.

The location identification module 502 may also include a location input module 606 configured to determine a geographic location of the mobile device 132 by requesting the user to input an address, city, zip code or other location information. In one embodiment, the user can select a location from a list of locations or a map on the mobile device 132. For example, a user on the mobile device 132 inputs the location of the mobile device 132 via an application or a web browser on the mobile device 132.

The location identification module 502 may also include a location-dependent search term module 604. The location of the mobile device 132 can be inferred when the user of the mobile device 132 requests a search on the mobile device using location-dependent search terms. For example, a user inputs a search on his/her mobile device for "Best Japanese Restaurant San Jose." The location-dependent search term module 604 consults a database (not show) that can determine the geographic location of the best Japanese restaurant in San Jose. The location-dependent search term module 604 then infers that the user of the mobile device 132 is at that geographic location. In an example embodiment, the location-dependent search term module 502 may infer the location of the user based on the search terms submitted by the user and irrespective of the search results or whether the user actually conducts the search. Using the foregoing example, the location-dependent search term module 504 may parse the search query entered by the user and infer that the user is located in or around San Jose.

The location identification module 502 may also include a tag module 608 configured to determine the geographic of the mobile device 132 based on a tag associated with a unique geographic location. The tag may include for example, a barcode tag, such as a linear barcode, QR barcode, or other two-dimensional (2D) barcode, a Radio Frequency Identification (RFID) tag that is associated with a unique geographic location. For example, a user of the mobile device 132 may use his/her mobile device to scan the tag placed at a landmark or store. The tag is uniquely associated with the geographic location of the landmark or store. Such relationship can be stored in a database. The tag module 608 can then determine the geographic location of the mobile device 132 based on the tag after consulting the database.

Figure 7:
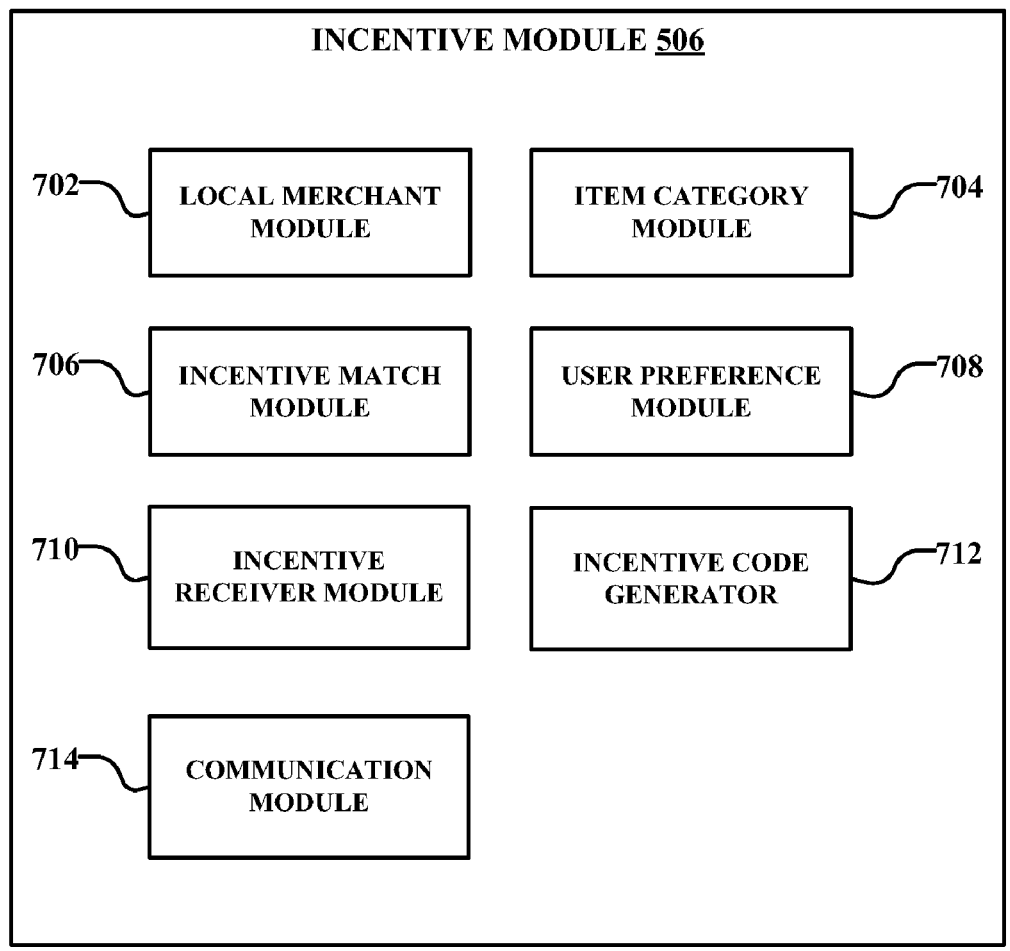
FIG. 7 is a block diagram illustrating an example embodiment of an incentive module.

FIG. 7 is a block diagram illustrating an example embodiment of the incentive module 506 that may used to execute the processes described herein. The incentive module 506 includes a local merchant module 702, an item category module 704, an incentive matching module 706, a user preference module 708, an incentive receiver module 710, an incentive code generator module 712, and a communication module 714.

The local merchant module 702 identifies at least one local merchant having at least one incentive based on the geographic location of the mobile device 132 as determined by the location identification module 502. A local merchant is a merchant or retailer that is located within a predefined distance from the geographic location of the mobile device 132. In one embodiment, the local merchant module 702 identifies at least one local merchant with at least one incentive based on an updated search distance preference as specified in the user preference module 708.

It should be noted that the incentive of the local merchant may or may not correspond to the item identified by the user. For example, a local merchant may feature a special sale on shoes while identified item corresponds to a digital camera. Once all local merchants having incentives are identified based on the geographic location of the mobile device (using a database of incentives), the incentive match module 706 filters all local merchants based on the identified item. In the previous example, the local merchant featuring a sale on shoes may be filtered out from the search result.

The item category module 704 determines a category of the item specified by the user and identified by item identification module 204. For example, the user may specify a particular digital camera. The item category module 504 determines that the item specified by the user falls into the category of electronics, subcategory of cameras.

The incentive match module 706 determines whether the identified item specified by the user corresponds to an item identified in at least one incentive of at least one local merchant as determined by local merchant module 702. For example, a user specifies an item with his/her mobile device 132. The item is identified as a specific digital camera. Item identification module 204 generates the brand, model number, color, and other attributes of the specified digital camera. Local merchant module 702 identifies merchants with incentives local to the geographic location of the mobile device 132. Incentive match module 706 matches local merchants with incentives (e.g., sale or discount) on the specific digital camera.

In another embodiment, the incentive match module 706 determines whether the category of the item identified by the user corresponds to a category of items as determined by item category module 704 and identified in at least one incentive of at least one local merchant. For example, a user specifies an item with his/her mobile device. The item is identified as a specific digital camera. Item identification module 204 generates the brand, model number, color, and other attributes of the specified digital camera. The item category module 704 determines the category of the identified item: electronics. Local merchant module 702 identifies merchants with incentives local to the geographic location of the mobile device. The incentive match module 706 matches local merchants with incentives (e.g., sale or discount) on electronics or categories related to the digital camera.

The user preference module 708 provides user-defined preferences used in the process of determining local merchants or brands or category of the items. In one embodiment, the user preference module 708 allows a user to update a search distance preference for local merchants. For example, the user may wish to decrease the radius of the distance preference in a downtown area of a city. Conversely, the user may wish to increase the radius of the distance preference in a suburban or rural area of a city. In another embodiment, user preference module 708 may also allow the user to specify favorite brands of items or favorite merchants or retailers.

The incentive code module 712 generates a code associated with at least one incentive selected by the user at the mobile device. The code is valid for a predetermined period of time at the corresponding local merchant. For example, a user selects a coupon from a local merchant on his/her mobile device. The incentive code module 712 generates a code associated with the coupon. The code is communicated to the mobile device of the user. The user takes the code to the corresponding local merchant to redeem the discount. The code can be redeemed at the local merchant by showing or telling the code to a cashier at the checkout register of the local merchant. The cashier may then enter the code at the checkout register to determine the validity of the code and appropriately apply the discount or promotion. The code can also be redeemed by displaying a machine-readable code such as a bar code on a screen of the mobile device. The user then displays the bar code to the cashier at the checkout register who can scan the bar code to determine the validity of the code and appropriately apply the discount or promotion.

In one embodiment, the code may be valid for a predetermined period of time (e.g., one day, one week). In another embodiment, the generated code may be uniquely associated with the user of the mobile device and may expire immediately upon usage.

The communication module 714 communicates one or more incentives of the identified item from at least one local merchant to the mobile device. For example, a list of local merchants within a preset distance radius (e.g., one mile) of the mobile device is displayed. The list of local merchants may include a sale or discount on the item identified by the user of the mobile device. The list may also include a list of recommended merchants (having an incentive on the identified item) that are located beyond the preset distance radius.

In another embodiment, the communication module 714 communicates one or more incentives of the identified category of the items from at least one local merchant to the mobile device. For example, a list of local merchants within a preset distance radius (e.g., a block) of the mobile device is displayed. The list of local merchants may include merchants having a sale or discount on similar or related items to the identified item specified by the user of the mobile device. The list may also include a list of recommended merchants (having an incentive on similar items to the identified item) that are located beyond the preset distance radius.

The incentive receiver module 710 collects attributes of incentives from merchants and stores the attributes of the incentives in an incentive database. An example of a data structure of the incentive database is further described in FIG. 8.

FIG. 8 is a block diagram illustrating attributes of an example of a data structure. In one embodiment, the data structure includes attributes of the incentives for an item. For example, the attributes include a name attribute of the merchant 802, a name attribute of the item 804, a brand attribute of the item 806, a model attribute of the item 808, a category tag of the item 810, a sub-category tag of the item 812, a financial promotion attribute of the item 814, and a financial promotion term attribute of the item 816.

The merchant name attribute 802 includes the name of the local merchant (e.g., Joe's Electronic Shop). The item name attribute 804 includes the name of an item (e.g., digital camera XYZ D001). The brand attribute 806 includes the brand name of the item (e.g., brand XYZ). The model attribute 808 includes the model number of the item (e.g., D001). The category tag 810 includes a category metadata associated with the item (e.g., personal electronics). The sub-category tag 812 includes a sub-category metadata associated with the item (e.g., digital camera). The financial promotion attribute 814 includes the sale or discount associated with the item (e.g., 40% off all digital cameras, or 20% off all brand XYZ digital cameras). The financial promotion term 816 includes the terms of the sale or discount associated with the item (e.g., discount expires on xx/xx/xxxx, discount expires one week from today, or discount valid today only).

Figure 9A:
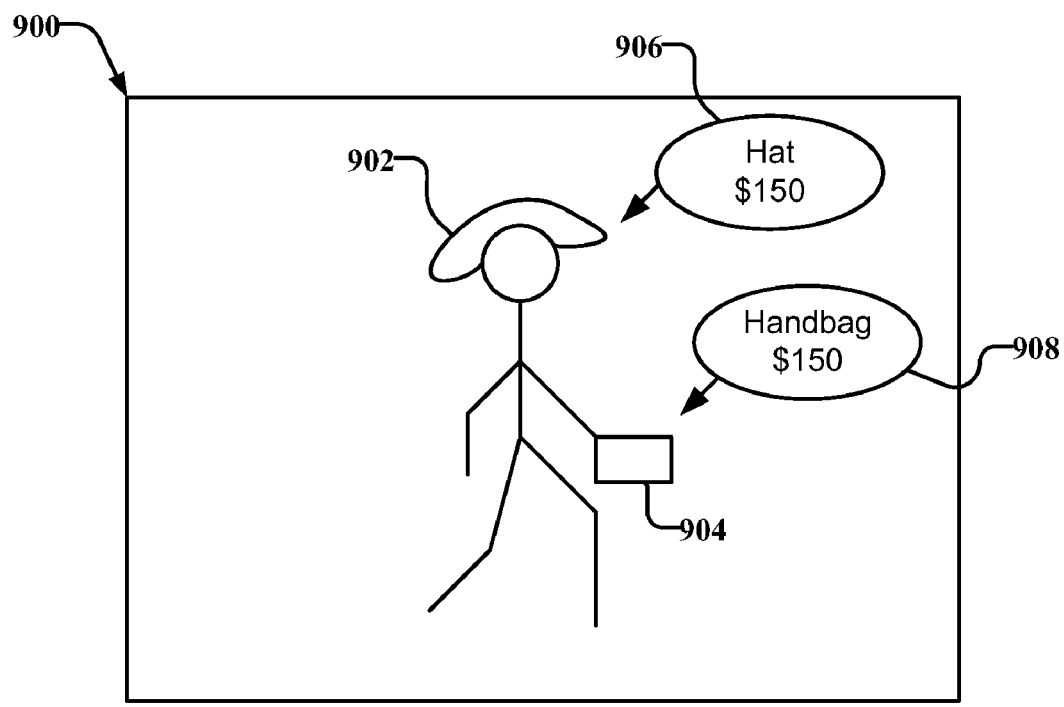
FIG. 9A is a block diagram illustrating an example of a tagged video frame.

FIG. 9A is a block diagram illustrating an example of a tagged video frame 900. The video frame 900 has been selected for processing by video frame selector module 202. The item identification module 204 has identified two items (e.g., a hat 902 and a handbag 904) in the video frame 900. The video frame tag module 304 generates a call out bubble on the video frame 900 for each identified item. In one embodiment, a call out bubble may be placed on the video frame adjacent to the respective identified item. For example, call out bubble 906 labels the hat 902 with a market price for the identified item. Similarly, call out bubble 908 labels the handbag 904 with a market price for the identified item.

Figure 9B:
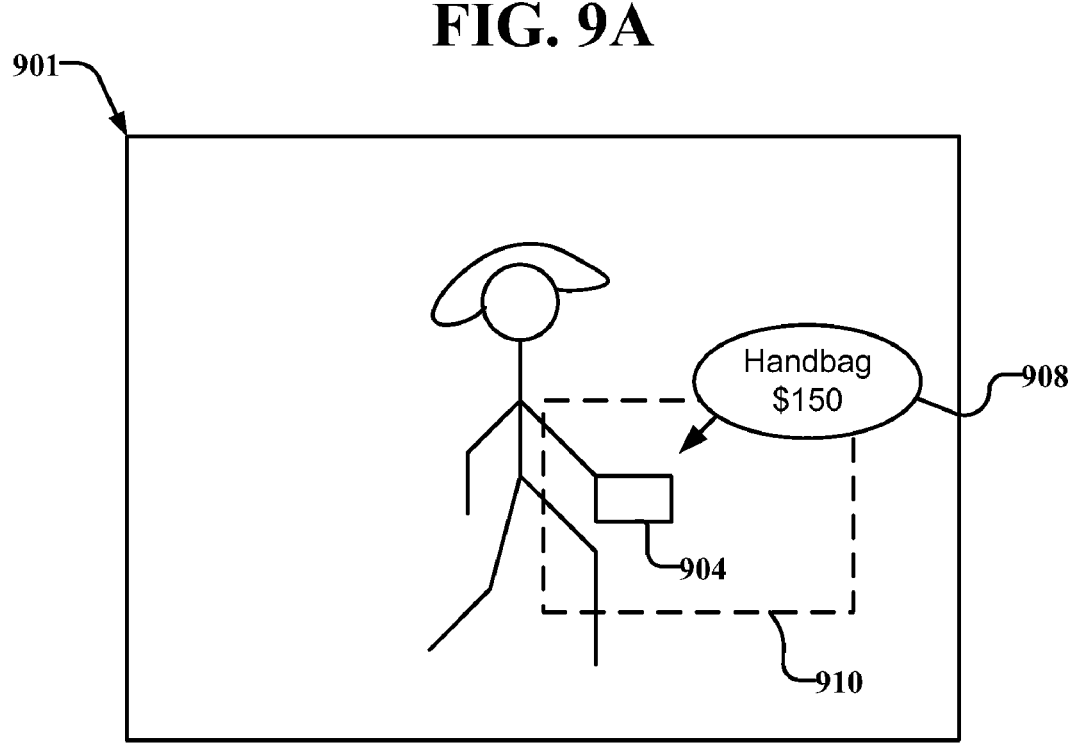
FIG. 9B is a block diagram illustrating another example of a tagged video frame.

FIG. 9B is a block diagram illustrating another example of a tagged video frame 901. The user has selected a particular area within the video frame for the item identification module 204 to process. For example, the user may only be interested in the handbag. As such, the user has delineated a region of interest 910 on the video frame 900 to identify the handbag 904.

Figure 10:
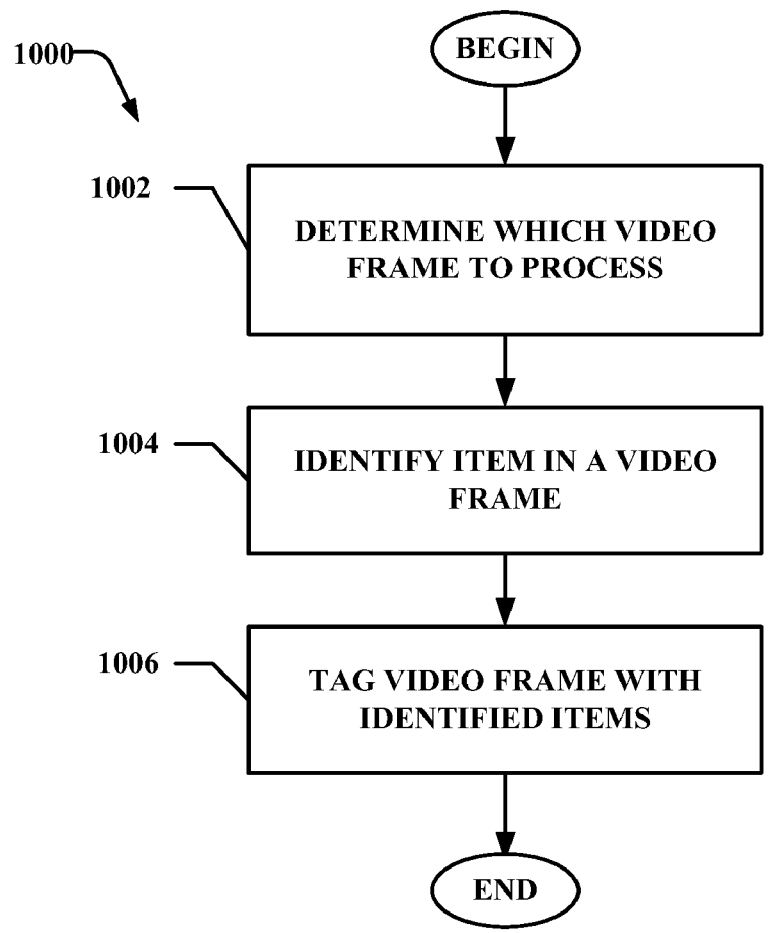
FIG. 10 is a flow diagram of an example method for tagging a video frame with items.

FIG. 10 is a flow diagram of an example method for tagging a video frame with items. At 1002, a video frame from a mobile device is determined whether to be processed. At 1004, items in the determined or selected video frame are identified. At 1006, the video frame may be tagged with an identification of the items in the video frame.

Figure 11:
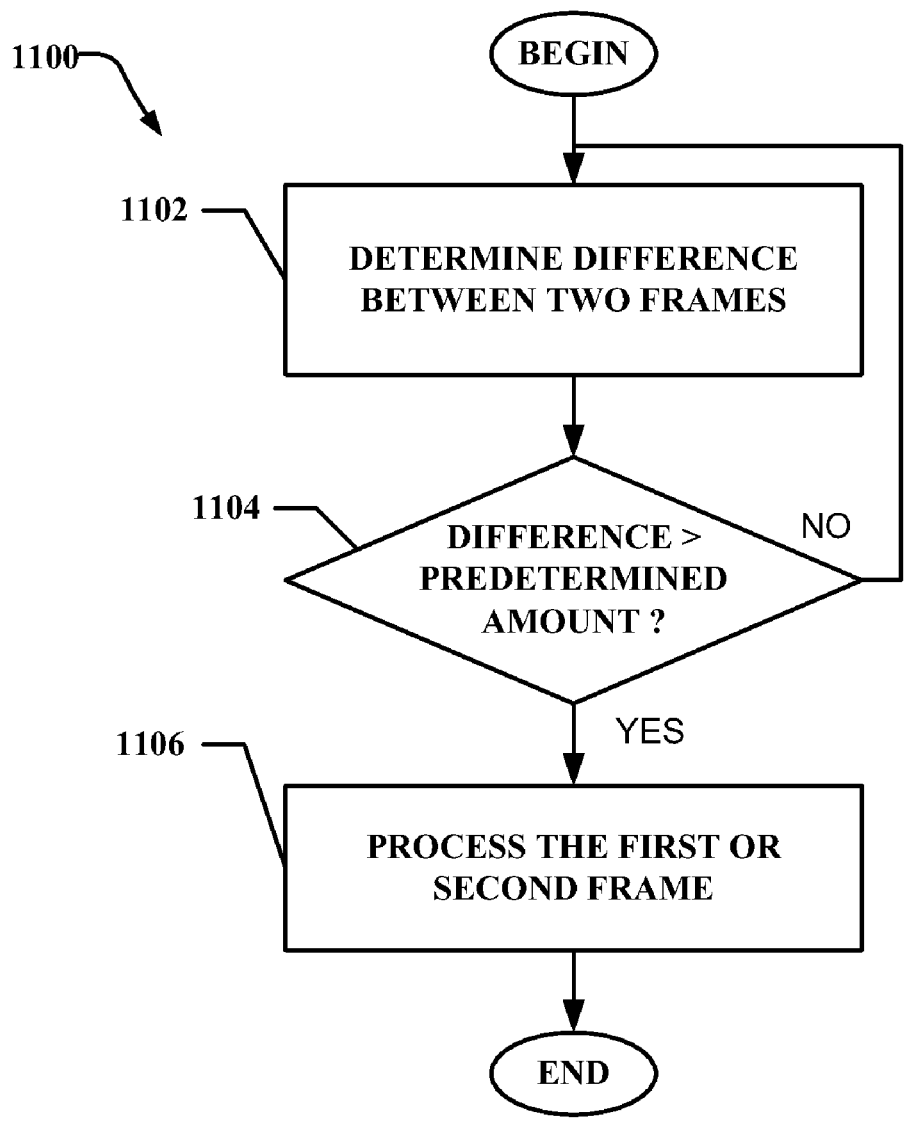
FIG. 11 is a flow diagram of an example method for selecting a video frame.

FIG. 11 is a flow diagram of an example method for selecting a video frame. At 1102, a difference between a first video frame and a second video frame is determined. At 1104, the difference between a first frame and a second video frame is compared to a predetermined amount of difference. If the difference exceeds the predetermined amount of difference, the first or second video frame is processed and tagged for item identification at 1106.

Figure 12:
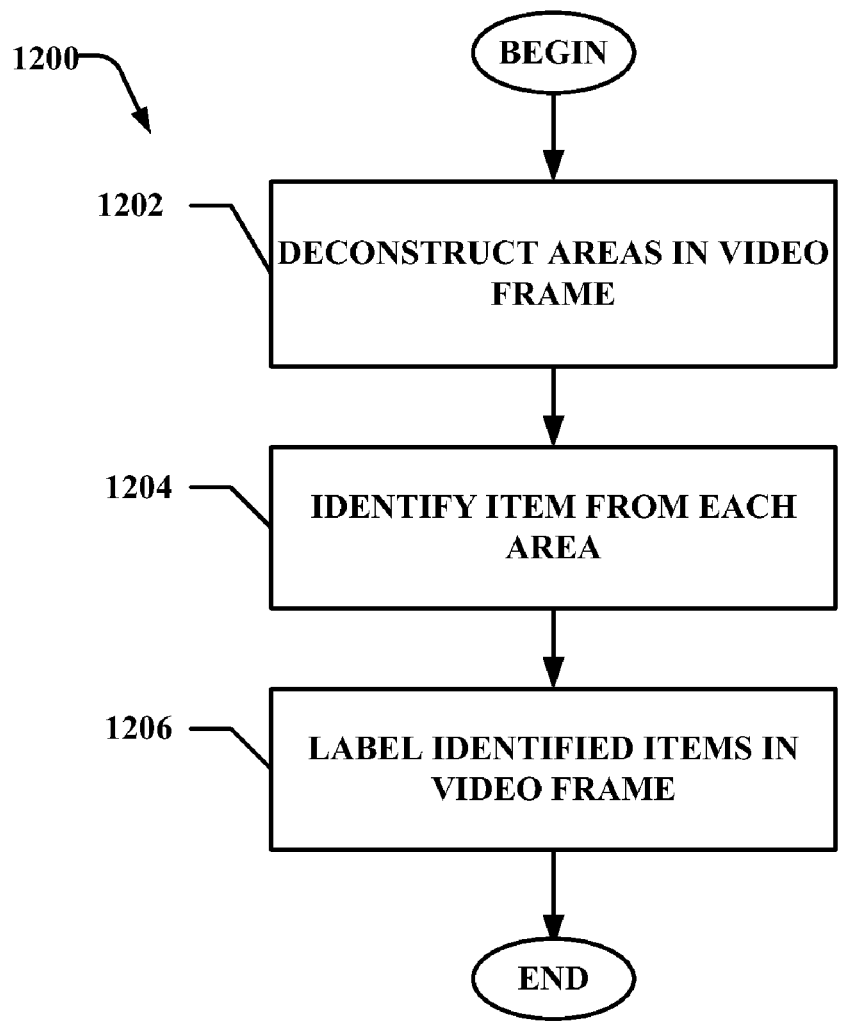
FIG. 12 is a flow diagram of an example method for tagging a video frame.

FIG. 12 is a flow diagram of an example method for tagging a video frame. At 1202, a scene in the determined video frame is deconstructed into a plurality of areas. At 1204, an item from each area is identified based on a comparison of an image of the item from the determined video frame with a library of item images. At 1206, the image of the identified item is labeled in the determined video frame.

Figure 13A:
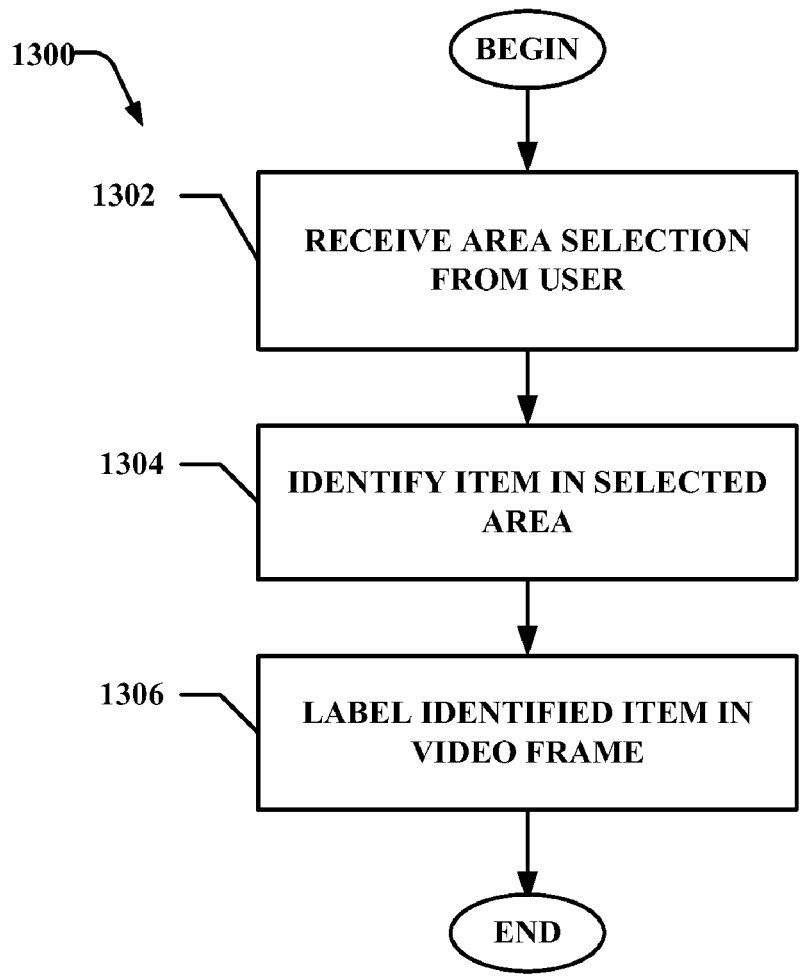
FIG. 13A is a flow diagram of an example method for identifying an item in a video frame.

FIG. 13A is a flow diagram of an example method for identifying an item in a video frame. At 1302, a user selects an area in the determined video frame to identify the item. At 1304, the item in the selected area of the determined video frame is identified. At 1306, the image of the identified item in the selected area of the determined video frame is labeled. In one embodiment, a name (e.g., brand, model) of the identified item and a price of the identified item are determined. The name and price of the identified item are placed adjacent to the image of the identified item in the determined video frame.

Figure 13B:
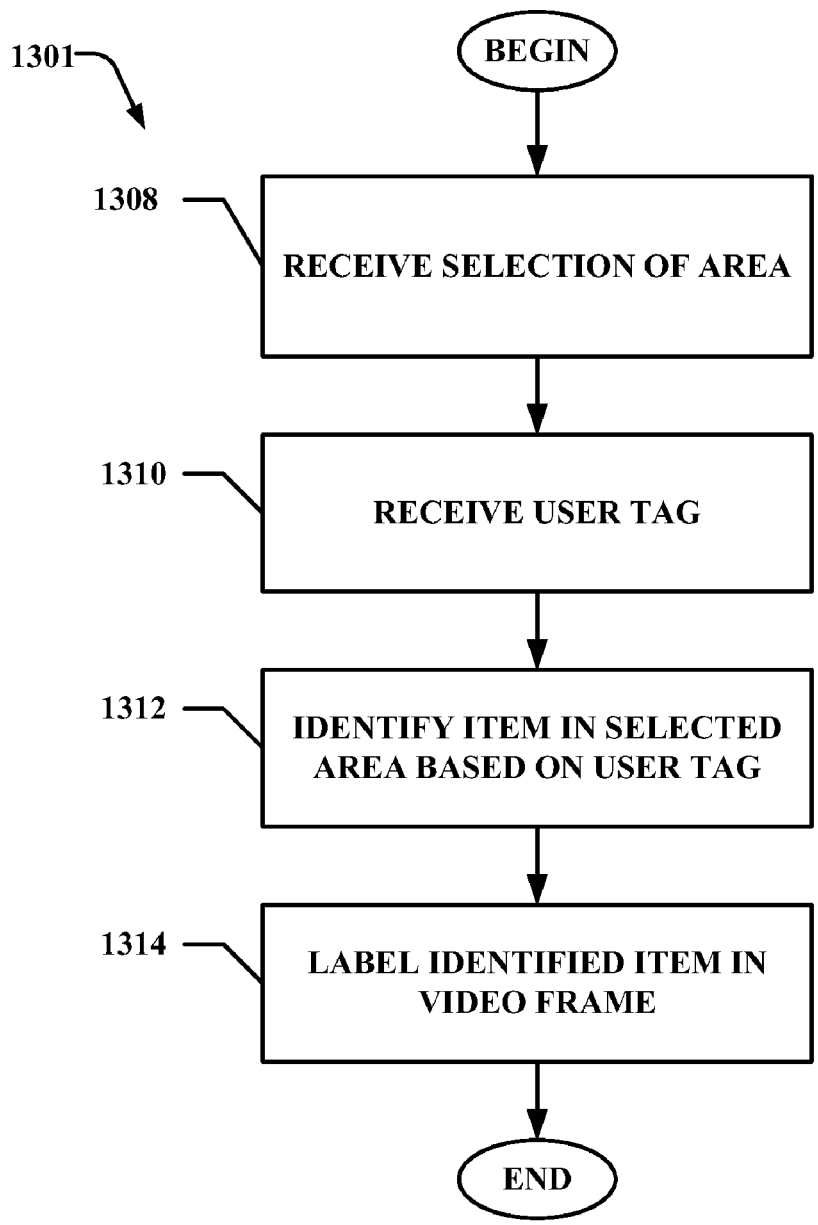
FIG. 13B is a flow diagram of another example method for identifying an item in a video frame.

FIG. 13B is a flow diagram of another example method for identifying an item in a video frame. At 1308, a user selects an area in the determined video frame to identify the item. At 1310, a user input tag is received to help identify the item in the determined video frame. At 1312, the item in the selected area of the determined video frame is identified based on the user input tag. At 1314, the image of the identified item in the selected area of the determined video frame is labeled.

Figure 14A:
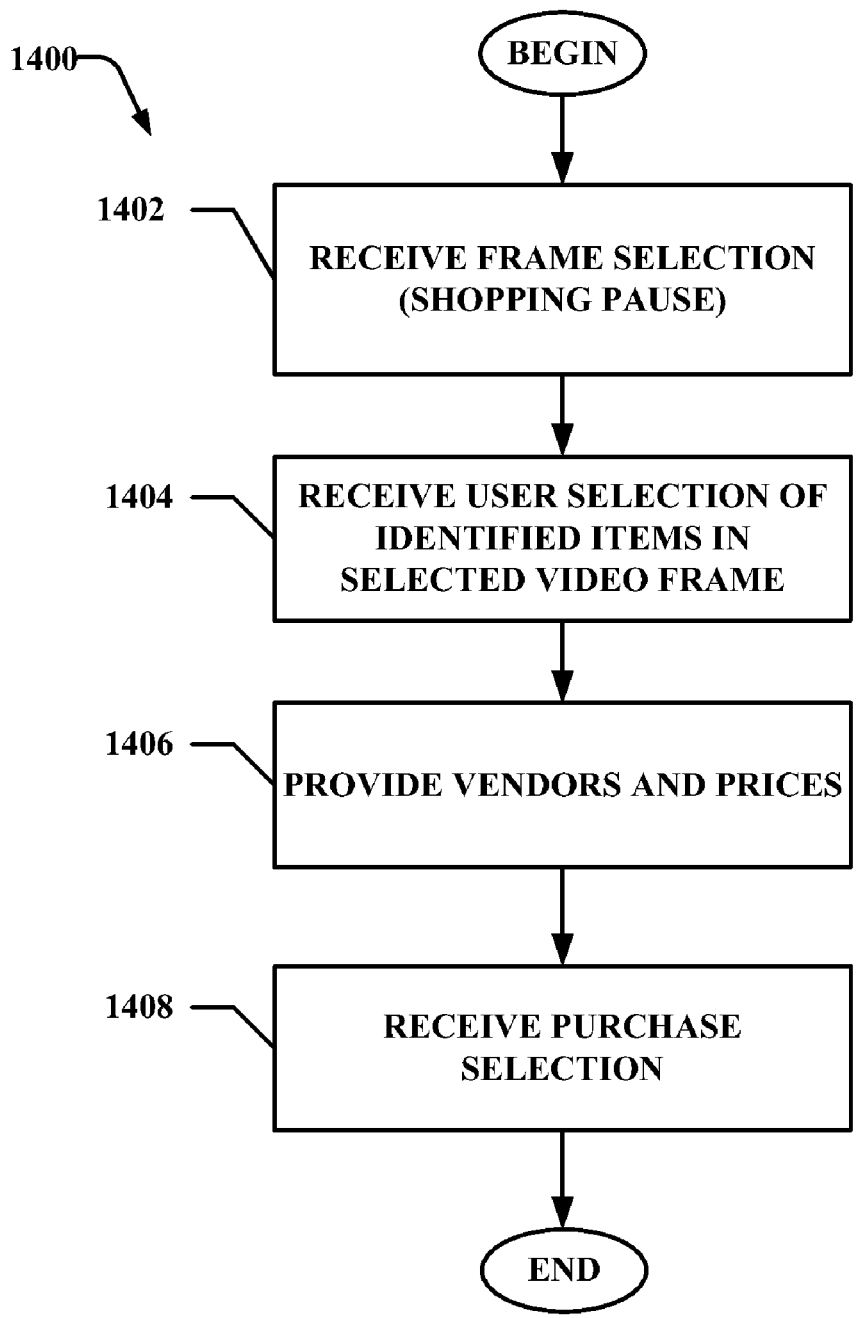
FIG. 14A is a flow diagram of an example method for providing information on an item in a tagged video frame.

FIG. 14A is a flow diagram of an example method for providing information on an item in a tagged video frame. At 1402, a video frame selection is received via the shopping pause feature as previously described. At 1404, the user selects an identified item in the video frame. At 1406, the system provides the vendors and merchants' prices. At 1408, the system allows the user to purchase the identified item selected in the video frame. If the user decides to purchase the identified item, the system receives the purchase selection from the user (including merchant selection).

Figure 14B:
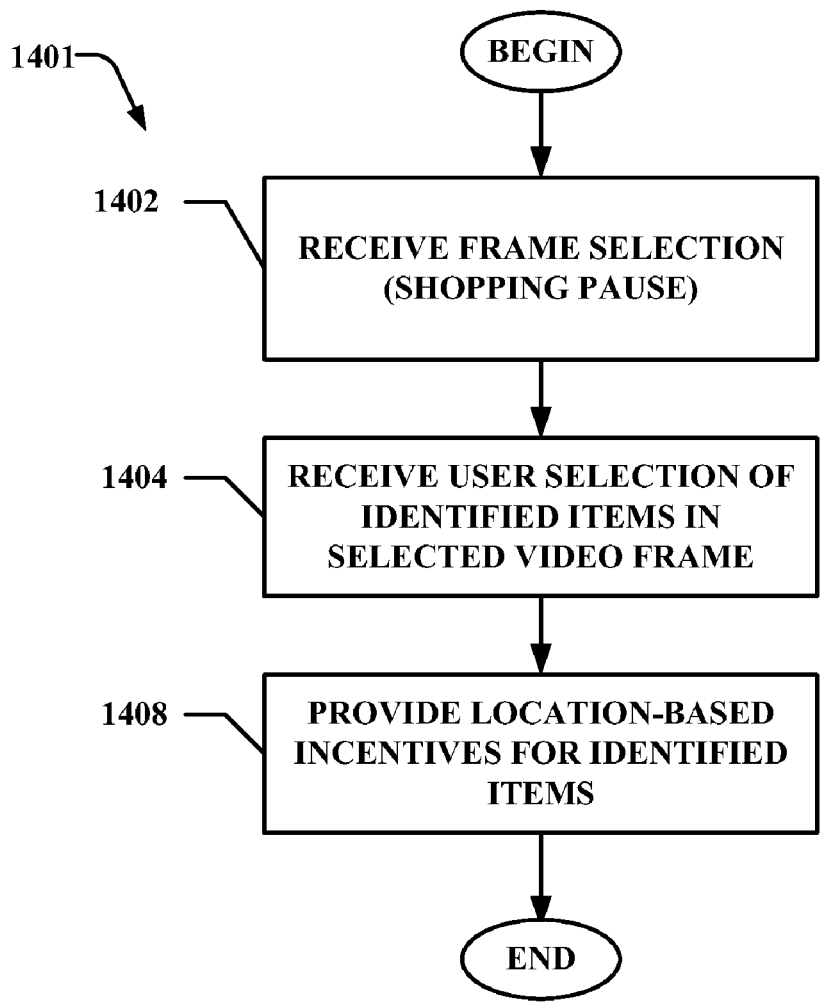
FIG. 14B is a flow diagram of an example method for providing location-based information on an item in a tagged video frame.

FIG. 14B is a flow diagram of an example method for providing location-based information on an item in a tagged video frame. At 1402, a video frame selection is received via the shopping pause feature as previously described. At 1404, the user selects an identified item in the video frame. At 1408, the system determines a geographic location of the mobile device 132 and offers an incentive from at least one local merchant based on the identified item and the geographic location of the mobile device 132. The incentive can be a coupon, a discount, or a recommendation.

Figure 15A:
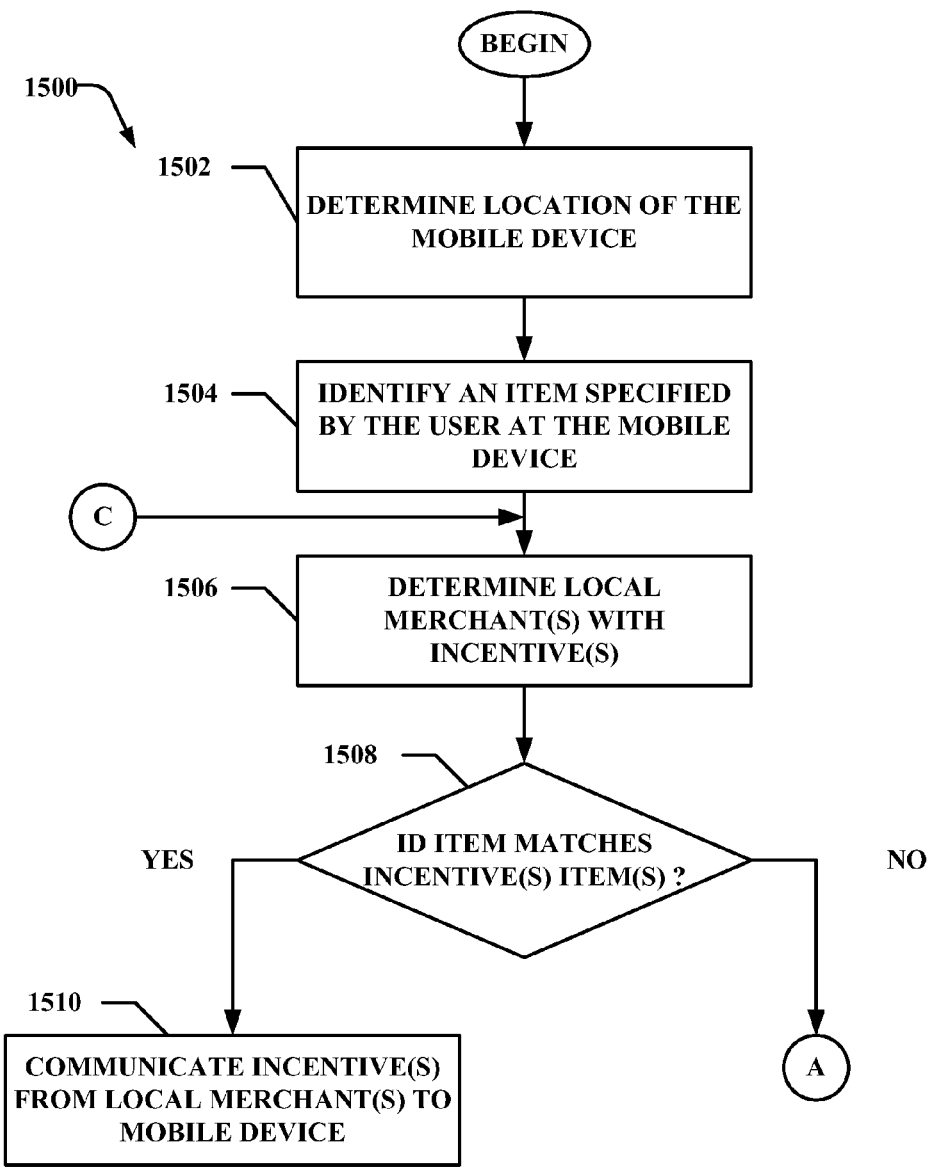
FIG. 15A is a flow diagram of another example method for identifying a location-based incentive.

FIG. 15A is a flow chart of an example method for identifying a targeted incentive. At 1502, the location identification module 502 of the location-based incentive application 208 determines the geographic location of the mobile device 132 of a user. At 1504, the item identification module 204 of the location-based incentive application 208 identifies an item specified by the user at the geographic location of the mobile device 132. At 1506, the local merchant module 702 of the incentive module 506 determines local merchants with at least one incentive. At 1508, the incentive match module 706 of the incentive module 506 of the location-based incentive application 208 determines whether the identified item as specified by the user corresponds to an item identified in at least one incentive of the local merchants as determined at operation 1506. At 1510, the communication module 714 of the incentive module 506 of the location-based incentive application 208 communicates a list of local merchants with incentives for the identified item.

Figure 15B:
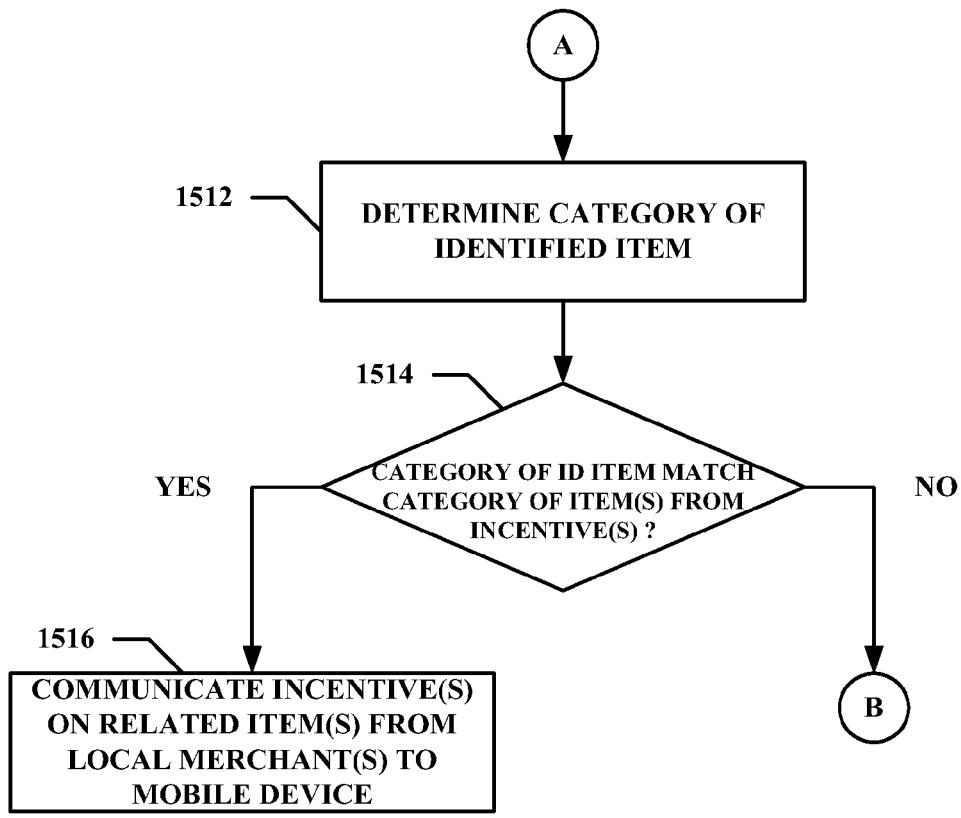
FIG. 15B is a flow diagram of another example method for identifying a targeted incentive.

FIG. 15B is a flow chart of another example method for identifying a targeted incentive. At 1512, if there are no local merchants having incentives on the identified item, the item category module 704 of the incentive module 506 of the location-based incentive application 208 determines a category of the identified item. At 1514, the incentive match module 706 of the incentive module 506 of the location-based incentive application 208 determines whether a category of the identified item as specified by the user corresponds to a category of items identified in at least one incentive of the local merchants as determined at operation 1506. At 1516, the communication module 714 of the incentive module 506 of the location-based incentive application 208 communicates a list of local merchants with incentives on similar or related items from the same category of the identified item.

Figure 15C:
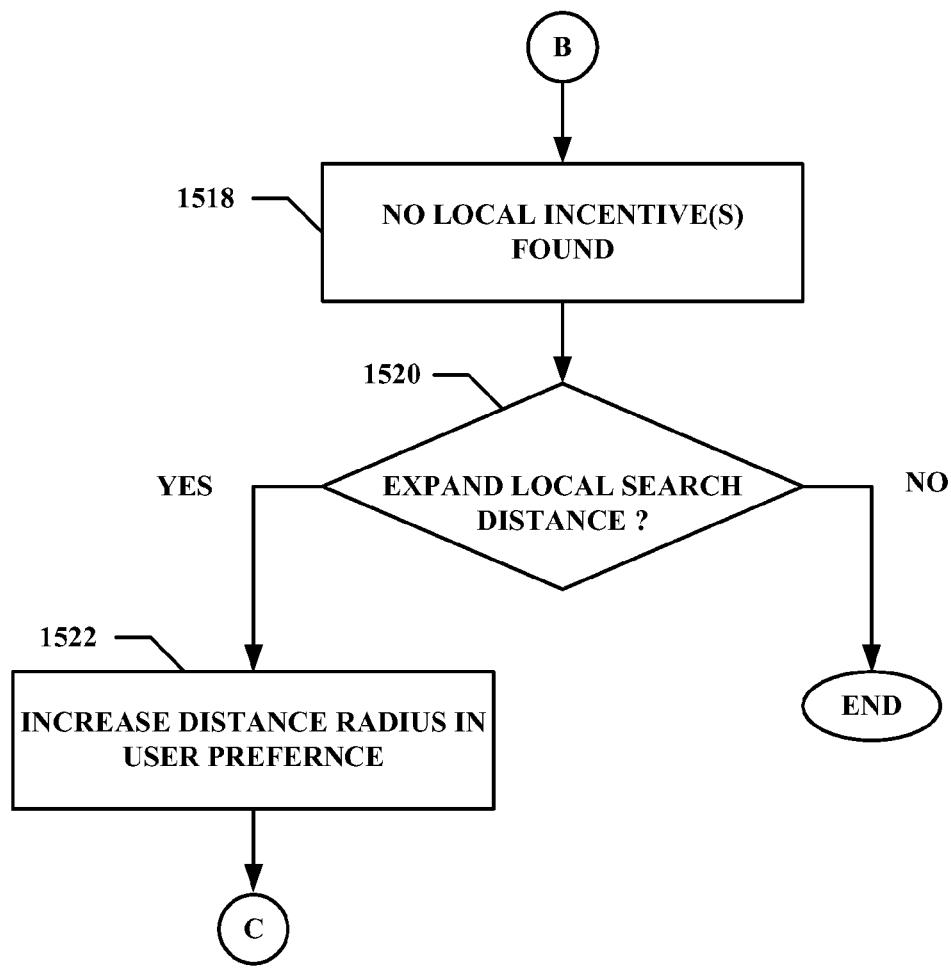
FIG. 15C is a flow diagram of an example method for expanding a search of local incentives.

FIG. 15C is a flow chart of an example method for expanding a search of local incentives. At 1518, the communication module 714 of the incentive module 506 of the location-based incentive application 208 communicates that the incentive match module 706 of the incentive module 506 of the location-based incentive application 208 cannot find any incentives from local merchants related to the identified item. At 1520, the incentive module 506 may offer the user to expand or increase the distance radius preference for local merchants in the user preference module 708. At 1522, the user preference module 708 may be updated to reflect a new distance radius preference when searching for local merchants with incentives.

Figure 16:
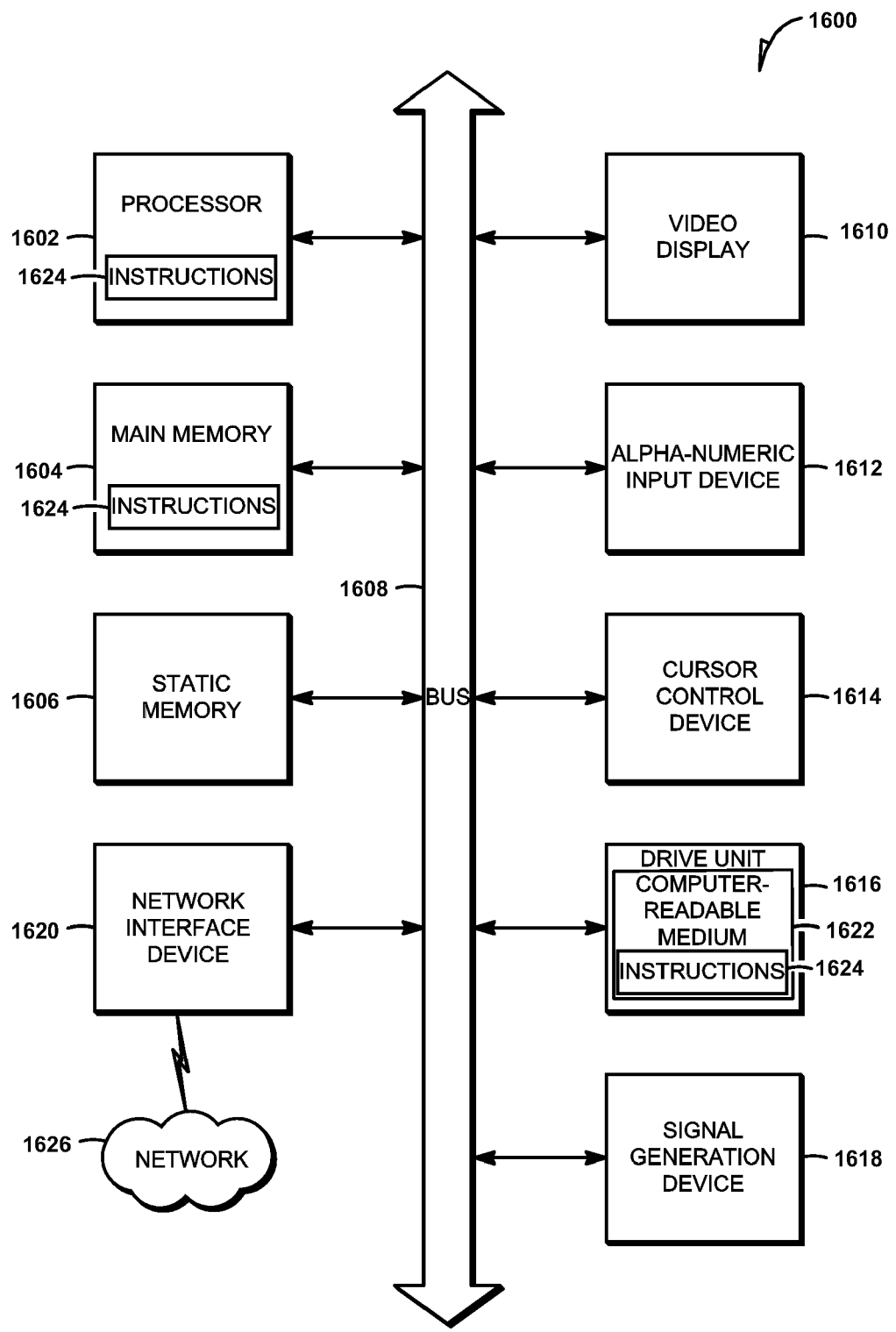
FIG. 16 shows a diagrammatic representation of machine in the example form of a computer system within which a set of instructions may be executed to cause the machine to perform any one or more of the methodologies discussed herein.

FIG. 16 shows a diagrammatic representation of machine in the example form of a computer system 1600 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a user interface (UI) navigation device 1614 (e.g., a mouse), a disk drive unit 1616, a signal generation device 1618 (e.g., a speaker) and a network interface device 1620.

The disk drive unit 1616 includes a machine-readable medium 1622 on which is stored one or more sets of instructions and data structures (e.g., software 1624) embodying or utilized by any one or more of the methodologies or functions described herein. The software 1624 may also reside, completely or at least partially, within the main memory 1604 and/or within the processor 1602 during execution thereof by the computer system 1600, the main memory 1604 and the processor 1602 also constituting machine-readable media.

The software 1624 may further be transmitted or received over a network 1626 via the network interface device 1620 utilizing any one of a number of well-known transfer protocols (e.g., HTTP).

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
    a receiver configured to receive a picture captured via an optical input of a mobile device;
    an area selection module configured to receive a selection of an area of the picture via a touch screen input on the mobile device;
    an item identification module configured to identify an item in the selected area of the picture and to tag the picture with an identification of the item; and
    a merchant offer module configured to generate an offer related to the identified item;
    wherein the item identification module comprises:
    a scene deconstructor module configured to deconstruct a scene in the picture into a plurality of areas;
    a user tag module configured to receive a user input tag to help identify the item in the selected area of the picture; and
    an image-recognition module configured to identify the item in the selected area based on the user input tag and a comparison of an image of the item from a library of item images, and to label the image of the identified item in the selected area of the picture.

2. The system of claim 1, wherein the receiver is configured to receive a video captured via the optical input of the mobile device, wherein the area selection module is configured to receive a selection of an area in a video frame of the video via the touch screen input on the mobile device, wherein the item identification module is configured to identify an item in the selected area in the video frame and to tag the video frame with the identification of the item.

3. The system of claim 1, wherein the offer is from a merchant located within a predefined geographic area based on a geographic location of the mobile device.

4. The system of claim 1, wherein the offer is from a merchant located within a predefined geographic area based on a geographic location of the mobile device at a time of the picture being captured.

5. The system of claim 2, further comprising:
a video frame analyzer module configured to determine a difference between a first video frame and a second video frame; and
a video frame tag module configured to tag the first or second video frame for item identification when the difference exceeds a predetermined amount.

6. The system of claim 1, wherein the image-recognition module is further configured to determine a name of the identified item and a price of the identified item, and to label the name and price of the identified item adjacent to the image of the identified item in the picture.

7. The system of claim 1, wherein the merchant module comprises:
a location identification module configured to determine a geographic location of the mobile device; and
an incentive module configured to generate a limited-time incentive offer from the at least one local merchant based on the identified item and the geographic location of the mobile device, wherein the limited-time incentive offer comprises a coupon, a discount, or a recommendation.

8. The system of claim 7, wherein the incentive module comprises:
a local merchant module configured to identify the at least one local merchant with at least one limited-time incentive offer based on the geographic location of the mobile device;
an incentive match module configured to determine whether the identified in the picture corresponds to an item identified in the at least one limited-time incentive offer of the at least one local merchant;
a communication module configured to communicate the at least one limited-time incentive offer of the identified item from the at least one local merchant to the mobile device; and
an incentive receiver module configured to receive attributes of limited-time incentive offers from at least one local merchant and store the attributes of the limited-time incentive offers in a database,
wherein the attributes of the limited-time incentive offers for an item comprises at least one of a name attribute of the local merchant, a name attribute of the item, a brand attribute of the item, a model attribute of the item, a category tag of the item, a sub-category tag of the item, a financial promotion attribute of the item, and a financial promotion term attribute of the item.

9. A computer-implemented method comprising:
receiving a picture captured via an optical input of a mobile device;
receiving a selection of an area of the picture via the touch screen input on the mobile device;
identifying an item in the selected area of the picture and tagging the picture with an identification of the item; and
generating an merchant offer related to the identified item;
wherein identifying the item comprises:
deconstructing a scene in the picture into a plurality of areas;
receiving a user input tag to help identify the item in the selected area of the picture; and
identifying the item in the selected area based on the user input tag and a comparison of an image of the item from a library of item images; and labeling the image of the identified item in the selected area of the picture.

10. The computer-implemented method of claim 9, further comprising:
receiving a video captured via the optical input of the mobile device;
receiving a selection of an area in a video frame of the video via the touch screen input on the mobile device;
identifying an item in the selected area in the video frame; and
tagging the video frame with the identification of the item.

11. The computer-implemented method of claim 9, wherein the offer is from a merchant located within a predefined geographic area based on a geographic location of the mobile device.

12. The computer-implemented method of claim 9, wherein the offer is from a merchant located within a predefined geographic area based on a geographic location of the mobile device at a time of the picture being captured.

13. The computer-implemented method of claim 10, further comprising:
determining a difference between a first video frame and a second video frame; and
tagging the first or second video frame for item identification when the difference exceeds a predetermined amount.

14. The computer-implemented method of claim 9, further comprising: determining a name of the identified item and a price of the identified item; and labeling the name and price of the identified item adjacent to the image of the identified item in the picture.

15. The computer-implemented method of claim 9, further comprising:
determining a geographic location of the mobile device; and
generating a limited-time incentive offer from the at least one local merchant based on the identified item and the geographic location of the mobile device, wherein the limited-time incentive offer comprises a coupon, a discount, or a recommendation.

16. The computer-implemented method of claim 15, further comprising:
identifying the at least one local merchant with at least one limited-time incentive offer based on the geographic location of the mobile device;
determining whether the identified in the picture corresponds to an item identified in the at least one limited-time incentive offer of the at least one local merchant;
communicating the at least one limited-time incentive offer of the identified item from the at least one local merchant to the mobile device; and
receiving attributes of limited-time incentive offers from at least one local merchant and storing the attributes of the limited-time incentive offers in a database,
wherein the attributes of the limited-time incentive offers for an item comprises at least one of a name attribute of the local merchant, a name attribute of the item, a brand attribute of the item, a model attribute of the item, a category tag of the item, a sub-category tag of the item, a financial promotion attribute of the item, and a financial promotion term attribute of the item.

17. A non-transitory computer-readable storage medium storing a set of instructions that, when executed by a processor, causes the processor to perform operations, comprising:
receiving a picture captured via an optical input of a mobile device;
receiving a selection of an area of the picture via the touch screen input on the mobile device;

identifying an item in the selected area of the picture and tagging the picture with an identification of the item; and
generating an merchant offer related to the identified item;
wherein identifying the item comprises:
deconstructing a scene in the picture into a plurality of areas;
receiving a user input tag to help identify the item in the selected area of the picture; and
identifying the item in the selected area based on the user input tag and a comparison of an image of the item from a library of item images; and labeling the image of the identified item in the selected area of the picture;
wherein identifying the item comprises:
deconstructing a scene in the picture into a plurality of areas;
receiving a user input tag to help identify the item in the selected area of the picture; and
identifying the item in the selected area based on the user input tag and a comparison of an image of the item from a library of item images; and labeling the image of the identified item in the selected area of the picture.

18. The non-transitory computer-readable storage medium of claim 17, further comprising:
receiving a video captured via the optical input of the mobile device;
receiving a selection of an area in a video frame of the video via the touch screen input on the mobile device;
identifying an item in the selected area in the video frame; and
tagging the video frame with the identification of the item.

\* \* \* \* \*

UNITED STATES PATENT AND TRADEMARK OFFICE
CERTIFICATE OF CORRECTION

Page 1 of 2

PATENT NO. : 8,213,916 B1
APPLICATION NO. : 13/341552
DATED : July 3, 2012
INVENTOR(S) : Yankovich et al.

It is certified that error appears in the above-identified patent and that said Letters Patent is hereby corrected as shown below:

In sheet 17 of 18, figure 15C, block 1522, delete "PREFERNCE", and insert --PREFERENCE--, therefor In column 2, Line 11, after "which", insert --,--, therefor In column 2, Line 60, delete "114", and insert --104--, therefor In column 3, Line 12, delete "114", and insert --104--, therefor In column 3, Line 13, before "the", and insert --that--, therefor In column 3, Line 14, delete "114", and insert --116--, therefor In column 3, Line 26, after "configured", insert --to--, therefor In column 3, Line 50, delete "114", and insert --116--, therefor In column 3, Line 63, delete "114", and insert --116--, therefor In column 5, Line 42, after "item", insert --,--, therefor In column 5, Line 59, after "focus", delete "on", therefor In column 6, Line 11, after "merchants", insert --,--, therefor In column 6, Line 18, delete "identifier", insert --identification--, therefor In column 6, Line 31, before "module", insert --service--, therefor Signed and Sealed this
Eleventh Day of September, 2012

David J. Kappos
*Director of the United States Patent and Trademark Office*

CERTIFICATE OF CORRECTION (continued)
U.S. Pat. No. 8,213,916 B1

In column 6, Line 37, before "module", insert --service--, therefor

In column 6, Line 60, delete "show", and insert --shown--, therefor

In column 6, Line 65, delete "502", and insert --604--, therefor

In column 7, Line 2, delete "504", and insert --604--, therefor

In column 7, Line 6, before "of", insert --location--, therefor

In column 7, Line 28, after "incentive", insert --,--, therefor

In column 7, Line 34, after "incentive", insert --,--, therefor

In column 7, Line 50, delete "504", and insert --704--, therefor

In column 7, Line 55, after "incentive", insert --,--, therefor

In column 7, Line 61, after "incentive", insert --,--, therefor

In column 10, Line 3, after "frame", insert --,--, therefor

In column 10, Line 42, after "merchant", insert --,--, therefor

In column 11, Line 56, after "stored", insert --,--, therefor

In column 13, Line 33, after "identified", insert --item--, therefor

In column 14, Line 55, before "item", insert --,--, therefor